United States Patent
Labasque et al.

(10) Patent No.: US 6,261,344 B1
(45) Date of Patent: Jul. 17, 2001

(54) PSA PROCESS USING A FAUJASITE ZEOLITE CONTAINING METAL CATIONS AS ADSORBENT

(75) Inventors: Jacques Labasque, Versailles; Bernard Lledos, Guyancourt; Serge Moreau, Velizy Villacoublay, all of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/379,318

(22) Filed: Aug. 23, 1999

(30) Foreign Application Priority Data

Aug. 21, 1998 (FR) .................................................. 98 10623

(51) Int. Cl.$^7$ .................................................. B01D 53/47
(52) U.S. Cl. .................................. 95/96; 95/102; 95/130; 95/902; 96/108
(58) Field of Search ........................ 95/96–98, 100–105, 95/130, 902; 96/108, 130

(56) References Cited

U.S. PATENT DOCUMENTS

| 4,859,217 | * | 8/1989 | Chao | ...................................... 95/130 |
| 5,152,813 | * | 10/1992 | Coe et al. | .......................... 95/130 X |
| 5,174,979 | | 12/1992 | Chao et al. | .......................... 423/715 |
| 5,258,058 | * | 11/1993 | Coe et al. | .......................... 95/130 X |
| 5,464,467 | * | 11/1995 | Fitch et al. | .......................... 95/130 X |
| 5,658,370 | * | 8/1997 | Vigor et al. | .......................... 95/130 X |
| 5,868,818 | * | 2/1999 | Ogawa et al. | ....................... 95/130 X |
| 5,922,107 | * | 7/1999 | Labasque et al. | .................. 95/130 X |
| 6,036,939 | * | 3/2000 | Funakoshi et al. | ................ 95/130 X |
| 6,053,966 | * | 4/2000 | Moreau et al. | .................... 95/130 X |
| 6,068,678 | * | 5/2000 | Labasque et al. | .................. 95/130 X |

FOREIGN PATENT DOCUMENTS

| 0 667 183 | 8/1995 | (EP) . |
| 0 685 430 | 12/1995 | (EP) . |
| 0 855 209 | 7/1998 | (EP) . |

\* cited by examiner

*Primary Examiner*—Robert H. Spitzer
(74) *Attorney, Agent, or Firm*—Young & Thompson

(57) ABSTRACT

A PSA or VSA process for separating a gas flow, such as air, containing at least one first gas compound, such as nitrogen, which is preferentially adsorbed on at least one adsorbent, and at least one second gas compound, such as oxygen, which is adsorbed less preferentially on at least the one adsorbent than the first gas compound. The adsorbent used comprises particles of faujasite zeolite having a Si/Al ratio <1.5, such as a LSX zeolite, and containing 80 to 99% $Li^+$ cations, 0.01 to 25% $Na^+$ cations, 0.01% to 10% $Mg^2$ cations, 0.01% to 10% $Ca^{2+}$ cations and 0 to 3% $K^+$ cations.

20 Claims, No Drawings

PSA PROCESS USING A FAUJASITE ZEOLITE CONTAINING METAL CATIONS AS ADSORBENT

FIELD OF THE INVENTION

The invention relates to a process of the PSA type, and more particularly of the VSA type, for separating a gas flow, in particular a gas flow containing essentially oxygen and nitrogen, such as air.

The gases in air, such as in particular oxygen and nitrogen, are very important industrially. At present, one of the non-cryogenic techniques used for producing these gases is the technique referred to as PSA (pressure swing adsorption), which encompasses not only PSA processes proper, but also similar processes, such as VSA (vacuum swing adsorption) or MPSA (mixed pressure swing adsorption).

According to this PSA technique, when the gas mixture to be separated is air and the component to be recovered is oxygen, the oxygen is separated from the gas mixture using preferential adsorption of at least nitrogen on a material which preferentially adsorbs at least nitrogen and is subjected to cycles of given pressure in the separation zone.

The oxygen, which is adsorbed little or not at all, is recovered at the outlet of the separation zone; it has a purity, in general, higher than 90%, or even than 93%.

More generally, a PSA process for the non-cryogenic separation of a gas mixture comprising a first compound which is adsorbed preferentially on an adsorbent material, and a second compound which is less preferentially adsorbed on the adsorbent material than the first compound, with a view to producing the second compound, cyclically comprises:

- a step of preferentially adsorbing at least the first compound on the adsorbent material, at an adsorption pressure referred to as the "high pressure", with recovery of at least some of the second compound produced in this way;
- a step of desorbing the first compound trapped in this way by the adsorbent, at a desorption pressure which is lower than the adsorption pressure and is referred to as the "low pressure";
- a step of recompressing the separation zone comprising the adsorbent, by progressively changing from the low pressure to the high pressure.

However, it is known that the separation efficiency for a gas mixture, such as air, depends on a number of parameters, in particular the high pressure, the low pressure, the type of adsorbent material used and its affinity for the compounds to be separated, the composition of the gas mixture to be separated, the adsorption temperature of the mixture to be separated, the size of the adsorbent particles, the composition of these particles and the temperature gradient set up inside the adsorbent bed.

At present, although it has not been possible to determine a general behaviour law, given that it is very difficult to connect these various parameters with one another, it is also known that the nature and properties of the adsorbent have an essential role in the overall efficiency of the process.

Currently, zeolites are the adsorbents most widely used in PSA processes.

The zeolite particles customarily contain mono-, di- and/or trivalent metal cations, for example cations of alkali metals, alkaline-earth metals, transition metals and/or lanthanides, incorporated during the synthesis of the zeolite particles and/or inserted subsequently by an ion-exchange technique, that is to say, in general, by bringing the unexchanged zeolite particles or raw zeolite into contact with a solution of one or more metal salts comprising the cation or cations to be incorporated into the zeolite structure, and subsequently recovering the particles of exchanged zeolite, that is to say zeolite containing a given quantity of metal cations. The proportion of metal cations introduced into the zeolite structure, relative to the-total exchange capacity, is referred to as the exchange factor, which is between 0 and 100%.

Furthermore, the adsorbents most widely used in processes of the PSA type for separating gases, in particular air, are zeolites, in particular of the X or LSX type, which are highly exchanged and contain in general more than 80%, or even more than 95% of very expensive metal cations such as in particular lithium cations. Such zeolites are, in particular, described in documents EP-A-486,384, EP-A-606,848, EP-A-589,391, EP-A-589,406, EP-A-548,755, U.S. Pat No. 5,268,023, EP-A-109,063 and EP-A-760,248.

However, the performance of the process, in particular the capacity or the adsorption selectivity, and the overall production cost of the gas can vary considerably according to the adsorbent employed in the PSA process.

OBJECT OF THE INVENTION

The object of the present invention is therefore to provide a process for separating gases, in particular a PSA process for separating the gases in air, employing an adsorbent of the zeolite type which can lead to performance better than that of processes using adsorbents of the prior art.

SUMMARY OF THE INVENTION

The present invention therefore relates to a PSA process for separating a gas flow containing at least one first gas compound which is preferentially adsorbed on at least one adsorbent, and at least one second gas compound which is adsorbed less preferentially on at least the adsorbent than the first gas compound, characterized in that the at least one adsorbent comprises particles of X zeolite having a Si/Al ratio <1.5 containing 80 to 99% $Li^+$ cations, 0.01 to 25% $Na^+$ cations, 0.01% to 10% $Mg^{2+}$ cations, 0.01% to 10% $Ca^{2+}$ cations and 0 to 3% $K^+$ cations.

The cation factor expressed in % is the proportion of metal cations contained in the zeolite phase in relation to the maximum proportion of cations which the zeolite phase of the adsorbent can contain.

Depending on the case, the adsorbent of the invention may include one or more of the following characteristics:

- the X zeolite has a Si/Al ratio equal to approximately 1, such a zeolite being referred to as a LSX (low silica X) zeolite.
- the X zeolite contains at least 85% $Li^+$ cations, preferably at least 86%, and/or at most 96% $Li^+$ cations.
- the X zeolite contains at most 15% $Na^+$ cations, preferably at most 14%, still preferably at most 12%, and/or at least 4% $Na^+$ cations.
- the X zeolite contains at most 5% $Mg^{2+}$ cations, preferably at most 2%, and/or at least 0.1% $Mg^{2+}$ cations, preferably at least 0.2%.
- the X zeolite contains at most 8% $Ca^{2+}$ cations, preferably at most 5%, and/or at least 0.2% $Ca^{2+}$ cations, preferably at least 1%.
- the X zeolite contains at most 3% $K^+$ cations, preferably at most 1%, preferably at most 0.5%.

the gas flow to be separated comprises nitrogen and at least one less polar gas compound, in particular oxygen and/or hydrogen, and, preferably the gas flow is air, the first gas compound being nitrogen and the second gas compound being oxygen. The air is, in the scope of the present invention, the air contained inside a building or a heated or unheated chamber, or the outside air, that is to say under atmospheric conditions, taken as such or optionally pretreated.

the first gas compound is nitrogen and the second gas compound is oxygen; and an oxygen-rich gas flow is produced, that is to say one generally comprising at least 90% oxygen.

it is of the VSA (vacuum swing adsorption) type, the high pressure for adsorption is between $10^5$ and $10^7$ Pa, preferably of the order of $10^5$ Pa to $10^6$ Pa, and/or the low pressure for desorption is between $10^4$ Pa and $10^6$ Pa, preferably of the order of $10^4$ Pa to $10^5$ Pa, the feed temperature is between 10° C. and 80° C., preferably between 25° C. and 60° C.

The invention furthermore relates to an adsorbent capable of being employed in a process according to the invention, which adsorbent comprises particles of X zeolite having a Si/Al ratio <1.5, preferably of the order of 1, containing 80 to 99% $Li^+$ cations, 0.01 to 20% $Na^+$ cations, 0.01% to 10% $Mg^{2+}$ cations, 0.01% to 10% $Ca^{2+}$ cations and 0 to 3% $K^+$ cations.

The invention furthermore relates to a device capable of carrying out a PSA process, such as the process described above, comprising at least one adsorber and, preferably, from 1 to 3 adsorbers; the adsorbers may in particular be ones having radial geometry.

It should be noted that the present invention also applies to each of the adsorbers of a process employing several adsorbents, for example a multibed process.

DETAILED DESCRIPTION OF THE INVENTION

The invention will now be described in more detail with the aid of examples which are given by way of illustration but without implying any limitation.

EXAMPLES

Zeolites A to E, whose compositions in terms of lithium, sodium, magnesium, calcium and potassium cations are given in Table I below, are used as the adsorbent in a process, of the VSA type, for separating the gases in air by adsorption, in order to produce oxygen having a purity of about 93%.

TABLE I

| | Composition of the zeolite phase | | | | |
|---|---|---|---|---|---|
| Zeolite No. | Li (in % by equivalents) | Na (in % by equivalents) | Mg (in % by equivalents) | Ca (in % by equivalents) | K (in % by equivalents) |
| A | 0 | 96.02 | 0.28 | 2.28 | 1.42 |
| B | 70.70 | 23.91 | 0.81 | 4.15 | 0.43 |
| C | 79.40 | 15.74 | 0.67 | 3.88 | 0.32 |
| D | 91.29 | 3.72 | 0.17 | 4.41 | 0.41 |
| E | 96.32 | 0.01 | 0.57 | 3.07 | 0.03 |

In these tests, the conditions under which the VSA process was employed are the following:

2 adsorbers operating in parallel adsorption pressure: $1.4 \cdot 10^5$ Pa desorption pressure: $0.4 \cdot 10^5$ Pa temperature of the feed air: approximately 35° C.

adsorbent: bed of zeolite A to E production cycles: 2×approximately 40 seconds

The performance, that is to say the yield and productivity, of the VSA process which is obtained for the tested zeolites A to E is given in Table II below in the form of indexed values (the reference being zeolite A).

The yield (expressed in %) is defined as being the ratio of the amount of pure oxygen contained in the oxygen produced to the amount of pure oxygen introduced.

The productivity (expressed in $m^3[stp]/h/m^3$ of adsorbent) is defined as being the ratio of the amount of pure oxygen contained in the oxygen produced to the amount (volume or mass) of adsorbent used for this production.

It should be noted that zeolites A to C do not fall within the scope of the present invention, whereas zeolites D and E are in accordance with the present invention.

TABLE II

| | VSA performance | |
|---|---|---|
| Zeolite No. | Yield | Productivity |
| A | 100.0 | 100.0 |
| B | 103.8 | 104.7 |
| C | 112.0 | 117.7 |
| D | 131.6 | 183.7 |
| E | 133.3 | 191.6 |

The results obtained show that the best performance (yield and productivity) is obtained for zeolites D and E according to the present invention.

The present invention is not limited to the field of producing oxygen from air and may accordingly be applied to the separation of other gas flows, such as in particular flows containing hydrogen, carbon dioxide and/or carbon monoxide, in particular to the production of synthesis gas or "syngas".

What is claimed is:

1. A PSA process for separating a gas flow containing at least one first gas compound which is preferentially adsorbed on at least one adsorbent, and at least one second gas compound which is adsorbed less preferentially on at least said adsorbent than said first gas compound, wherein said at least one adsorbent comprises particles of X zeolite having a Si/Al ratio <1.5 and containing 80 to 99% $Li^+$ cations, 0.01 to 20% $Na^+$ cations, 0.01% to 10% $Mg^{2+}$ cations, 0.01% to 10% $Ca^{2+}$ cations, and 0 to 3% $K^+$ cations wherein the sum of the contents of $Li^+$, $Na^+$, $Mg^{2+}$, $Ca^{2+}$ and $K^+$ cations is equal to 100% of the metal cation content in the zeolite phase of the adsorbent.

2. The process according to claim 1, wherein said Si/Al ratio is equal to approximately 1.

3. The process according to claim 1, wherein said X zeolite contains at least 85% $Li^+$ cations.

4. The process according to claim 1, wherein said X zeolite contains at least 86% $Li^+$ cations.

5. The process according to claim 1, wherein said X zeolite contains at most 96% $Li^+$ cations.

6. The process according to claim 1, wherein said X zeolite contains at most 15% $Na^+$ cations.

7. The process according to claim 1, wherein said X zeolite contains at most 12% $Na^+$ cations.

8. The process according to claim 1, wherein said X zeolite contains at least 4% $Na^+$ cations.

9. The process according to claim 1, wherein said X zeolite contains at most 5% $Mg^{2+}$ cations.

10. The process according to claim 1, wherein said X zeolite contains at most 2%, and at least 0.1% $Mg^{2+}$ cations.

11. The process according to claim 1, wherein said X zeolite contains at most 8% $Ca^{2+}$ cations.

12. The process according to claim 11, wherein said X zeolite contains at most 5% $Ca^{2+}$ cations.

13. The process according to claim 1, wherein said X zeolite contains at least 0.2% $Ca^{2+}$ cations.

14. The process according to claim 1, wherein said X zeolite contains at most 3% $K^+$ cations.

15. The process according to claim 1, wherein said X zeolite contains at most 1% $K^+$ cations.

16. The process according to claim 1, wherein said process is a vacuum swing adsorption (VSA) process.

17. The process according to claim 1, wherein the gas flow to be separated comprises nitrogen and at least one less polar gas compound selected from the group consisting of oxygen, hydrogen, and mixtures thereof.

18. The process according to claim 1, wherein the gas flow is air, the first gas compound is nitrogen, and the second gas compound is oxygen.

19. Adsorbent for use in a PSA process for separating a gas flow containing at least one first gas compound which is preferentially adsorbed on at least one adsorbent, and at least one second gas compound which is adsorbed less preferentially on at least said adsorbent than said first gas compound, the adsorbent comprising particles of X zeolite having a Si/Al ratio <1.5, and containing 80 to 99% $Li^+$ cations, 0.01 to 20% $Na^+$ cations, 0.01% to 10% $Mg^{2+}$ cations, 0.01% to 10% $Ca^{2+}$ cations, and 0 to 3% $K^+$ cations, wherein the sum of the contents of $Li^+$, $Na^+$, $Mg^{2+}$, $Ca^{2+}$ and $K^+$ cations is equal to 100% of the metal cation content in the zeolite phase of the adsorbent.

20. The adsorbent according to claim 19, wherein the Si/Al ratio is equal to about 1.

* * * * *